(12) United States Patent
Sato

(10) Patent No.: US 6,275,529 B1
(45) Date of Patent: *Aug. 14, 2001

(54) METHOD OF AND APPARATUS FOR TRANSMITTING NEWS DATA WITH SCRIPT

(75) Inventor: Ichitaro Sato, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,870

(22) Filed: May 14, 1998

Related U.S. Application Data

(63) Continuation of application No. 08/626,847, filed on Apr. 3, 1996, now abandoned.

(30) Foreign Application Priority Data

Apr. 5, 1995 (JP) .................................................. 7-080517

(51) Int. Cl.[7] .................................................. H04N 7/12
(52) U.S. Cl. .................................. 375/240.01; 348/423.3; 386/55
(58) Field of Search ................................ 348/6, 13, 383, 348/385, 423, 469, 473, 476, 722–727, 845, 423.1; 381/18; 455/12.1, 457, 3.02; 386/55, 57, 52; 375/240, 240.01, 240.26; 725/63, 114, 131, 138–139; H04N 7/12

(56) References Cited

U.S. PATENT DOCUMENTS

| | | | | | |
|---|---|---|---|---|---|
| 4,858,033 | * | 8/1989 | Chippendale | .......................... | 386/57 |
| 5,099,319 | * | 3/1992 | Esch et al. | .......................... | 348/722 |
| 5,130,794 | * | 7/1992 | Ritchey | .......................... | 348/383 |
| 5,140,694 | * | 8/1992 | Benden | .......................... | 455/12.1 |
| 5,182,677 | * | 1/1993 | Kizu et al. | .......................... | 386/55 |
| 5,283,639 | * | 2/1994 | Esch et al. | .......................... | 348/722 |
| 5,430,492 | * | 7/1995 | Dambacher | .......................... | 348/469 |
| 5,432,841 | * | 7/1995 | Rimer | .......................... | 455/457 |
| 5,483,287 | * | 1/1996 | Siracusa | .......................... | 375/240.26 |
| 5,485,221 | * | 1/1996 | Banker et al. | .......................... | 725/139 |
| 5,524,054 | * | 6/1996 | Spille | .......................... | 381/18 |
| 5,568,205 | * | 10/1996 | Hurwitz | .......................... | 348/723 |
| 5,594,936 | * | 1/1997 | Rebec et al. | .......................... | 455/3.02 |
| 5,633,891 | * | 5/1997 | Rebec et al. | .......................... | 375/240 |

* cited by examiner

*Primary Examiner*—Richard Lee
(74) *Attorney, Agent, or Firm*—Frommer Lawrence & Haug, LLP.; William S. Frommer; Gordon Kessler

(57) ABSTRACT

A method of transmitting news data with script can simultaneously transmit video information and corresponding added information such as gathered news information to a news center from a news gathering field by use of an existing news transmission system. Digital video data, obtained by a video camera in a field, is timebase-compressed, and digital audio data is prepared on the basis of an audio signal. Added information such as script information is prepared as digital added information, and composite news data is generated by time-division-mixing these video data, audio data, and added information data. The composite news data is transmitted to a video receiving station by use of a news gathering system. In the video receiving station, the composite news data is time-division-distributed, and the time-division-distributed data is timebase-expanded, and combined with time-division-distributed audio data thereby to generate a video image signal. Simultaneously, a script, which is a broadcasting script, is generated from the time-division-distributed added information data.

8 Claims, 7 Drawing Sheets

METHOD OF AND APPARATUS FOR TRANSMITTING NEWS DATA WITH SCRIPT

This application is a continuation of U.S. application Ser. No. 08/626,847, filed Apr. 3, 1996, now abandoned.

BACKGROUND OF THE INVENTION

The present invention relates to method of and apparatus for transmitting news data with script for use with a system for gathering news.

When gathering news such as incident or accident, a cameraman and a journalist visit the field of incident or accident with an FPU (field pick-up) apparatus or by a field pick-up van. On the field of incident or accident, the cameraman takes a picture of news material by a video camera, and the journalist writes a news story (script) and gathers news material of incident or accident in detail. The FPU apparatus is a general term for equipments for relaying news material from the field to a video base station (e.g., key television broadcasting station in the metropolitan area), and includes equipments for transmitting video and audio signals of video image and equipments such as mobile telephones for communicating contents of gathered news (script) written by the journalist to the key television broadcasting station.

A video film of news data is treated by a coarse edit for eliminating useless video film portions on the field, and transmitted to the video base station via an FPU transmission line or, recently, a transmission line of SNG (satellite news gathering) system.

FIG. 1 of the accompanying drawings shows an ENG (electronic news gathering) system for transmitting news data between the field and the video base station.

As shown in FIG. 1, a news material is picked up by a video camera 51, and a picked-up image from the video camera 51 is recorded by a VCR (video cassette recorder) 53. An analog composite video signal outputted from the VCR 53 is transmitted from a portable antenna 55 of the FPU apparatus on the field through a relay station having a stationary parabola antenna 57 installed on high ground such as the top of a mountain to a stationary parabola antenna 61 of a video station 59 via microwaves.

FIG. 2 shows an SNG system using a satellite used in transmitting data of news material between the field and the video base station. In this SNG system using a satellite shown in FIG. 2, an analog composite video signal from a mobile antenna 63 and a portable antenna 55 of an earth station (up-link) which is an FPU apparatus carried to the field is immediately transmitted through an artificial satellite transponder (relay station) 13 to a stationary parabola antenna 65 of the video base station 59. Thus, the SNG system using satellite has excellent merits from a prompt report standpoint. At present, common carriers (e.g., SCC and JC-SAT) control artificial satellites, and several transponders are commonly used by several broadcasting stations and network-broadcasting stations.

Further, at present, a development of a DSNG (digital satellite news gathering) system is started being considered as a future SNG system for transmitting a digital signal.

Of information transmitted to the video base station, video information is edited by a control center (often referred to as a "news center" in some broadcasting stations) within the video base station, and the video information and gathered news written by the journalist are compared and combined. If necessary, the gathered news data is corrected as a script (broadcasting script). When a news program is broadcasted, video image is broadcasted with background sounds. At the same time, a manner in which an announcer or newscaster reads the script and the newscaster explains news is televised.

In the SNG system (see FIG. 2) which is now commercially available, a transmitted signal is an analog composite color video signal (video signal) which is continuous in time. A corresponding audio signal (audio signal) is superimposed upon the analog composite color video signal, and then transmitted. Accordingly, a signal transmitted according to the SNG system has neither spacing on the timebase nor empty portion on the frequency band for adding these information data. The gathered news (script) of journalist is transmitted to the video base station 59 by use of a public telephone line connecting a field telephone 101 to a video base station telephone 103 which is an independent route from the SNG system, and is transmitted to the video base station 59 in the form of sounds.

In this case, in the news center located within the video base station 59 for receiving information, the video signal and the gathered news (script) transmitted through the two routes are compared with each other, and the video signal and the gathered news are combined properly. Thereafter, the video signal (video image and sounds) are edited. If necessary, the gathered news is corrected, and generated as a broadcasting script.

However, a huge amount of video information and gathered news concerning news data are centered to the news center located within the video base station every day. Therefore, it is difficult to properly control video information and gathered news, to compare them correctly and rapidly and to transmit them to the news center.

Furthermore, a gathered news script which contains many persons' names and place names should preferably be transmitted from the field to the news center in the form of characters with kanji (Chinese character) mixed thereto. Specifically, since kanji has homonyms, it is frequently observed that place names, etc., cannot be accurately transmitted via only sounds by the telephone without difficulty. Thus, person's names and place names should preferably be transmitted in the form of characters with kanji mixed thereto.

SUMMARY OF THE INVENTION

In view of the aforesaid aspect, it is an object of the present invention to provide method of and apparatus for transmitting news data with script in which video information and added information such as gathered news information are made corresponding to each other and the video information and the added information can be simultaneously transmitted from a news gathering field to a news center by use of a single transmission line.

It is another object of the present invention to provide method of and apparatus for transmitting news data with script in which gathered news information, which is transmitted together with video information upon transmission, can be transmitted in the form of characters with kanji mixed thereto but not in the form of audio data.

According to an aspect of the present invention, there is provided a method of transmitting news data to a video receiving station from a news gathering field by use of a news gathering system. This method of transmitting news data is comprised of the steps of converting video information, obtained by a video camera, into digital video data, timebase-compressing the digital video data, converting audio information, obtained by the video camera, into digital audio data, generating digital added information data from added information including at least script information and time code information, generating composite news data by mixing the timebase-compressed digital video data, the digital audio data and the added information data in a time-division manner, transmitting the composite news data to the video receiving station by use of the news gathering system, distributing the composite news data received at the video receiving station in a time-division manner, timebase-expanding the timebase-compressed and time-division-distributed video data, reproducing a video signal based on the timebase-expanded video data and the time-division-distributed audio data, and generating script, which is broadcasting script, from the time-division-distributed added information data.

In accordance with another aspect of the present invention, there is provided an apparatus for transmitting news data. This apparatus for transmitting news data includes a transmitting equipment on a field, a circuit equipment for transmitting news from the field to a broadcasting station, and a receiving equipment of the broadcasting station. The transmitting-side equipment of the field is comprised of camera means for shooting a field, video data generating means for generating a digital video signal based on an output signal of the camera means, and generating digital video data by encoding and compressing the digital video signal, audio data generating means for generating digital audio data based on an output signal of the camera means, script information generating means for generating digital script data based on script written by a journalist on the field, added information data generating means for generating digital added information data based on added information, and time-division-mixing means for time-division-mixing the digital video data, the digital audio data, the digital script data and the digital added information, and transmitting resultant data as digital composite news data, the circuit equipment for transmitting the digital composite news data to a broadcasting station to the field being either a satellite news gathering system or an electronic news gathering system. The receiving-side equipment of the broadcasting station is comprised of time-division-distributing means for time-division-distributing the received digital composite news data at the same time standard as that of the time-division-mixing means, video signal reproducing means for reproducing an analog video signal by timebase-expanding and decoding the time-division-distributed digital video data, audio signal reproducing means for reproducing an analog audio signal from the time-division-distributed digital audio data, VCR (video cassette recorder) means for recording the analog video signal and the analog audio signal, script information reproducing means for reproducing script information from the time-division-distributed script information data, and added information reproducing means for reproducing added information from the time-division-distributed added information data.

According to the method of and apparatus for transmitting news data of the present invention, the analog video signal with a large information amount is digitally converted to the timebase-compressed video data, and the composite news data is generated in which audio data and digital data such as other added information are not superimposed upon the video data but combined in a time-division manner in the vacant time area. Then, a variety of data relating to a specific news are transmitted as the composite news data simultaneously. In that case, the existing analog SNG system uses the transmission method that can transmit such digital data.

By use of the method of transmitting a plurality of relating news data as the composite news data, the added information including script information is simultaneously transmitted together with video image, and gathered news information are simultaneously transmitted as character data with kanji mixed thereto.

DETAILED DESCRIPTION OF THE PREFERRED EMBODIMENT

Method of and apparatus for transmitting news data with script according to an embodiment of the present invention will hereinafter be described with reference to the drawings.

Figure 3:
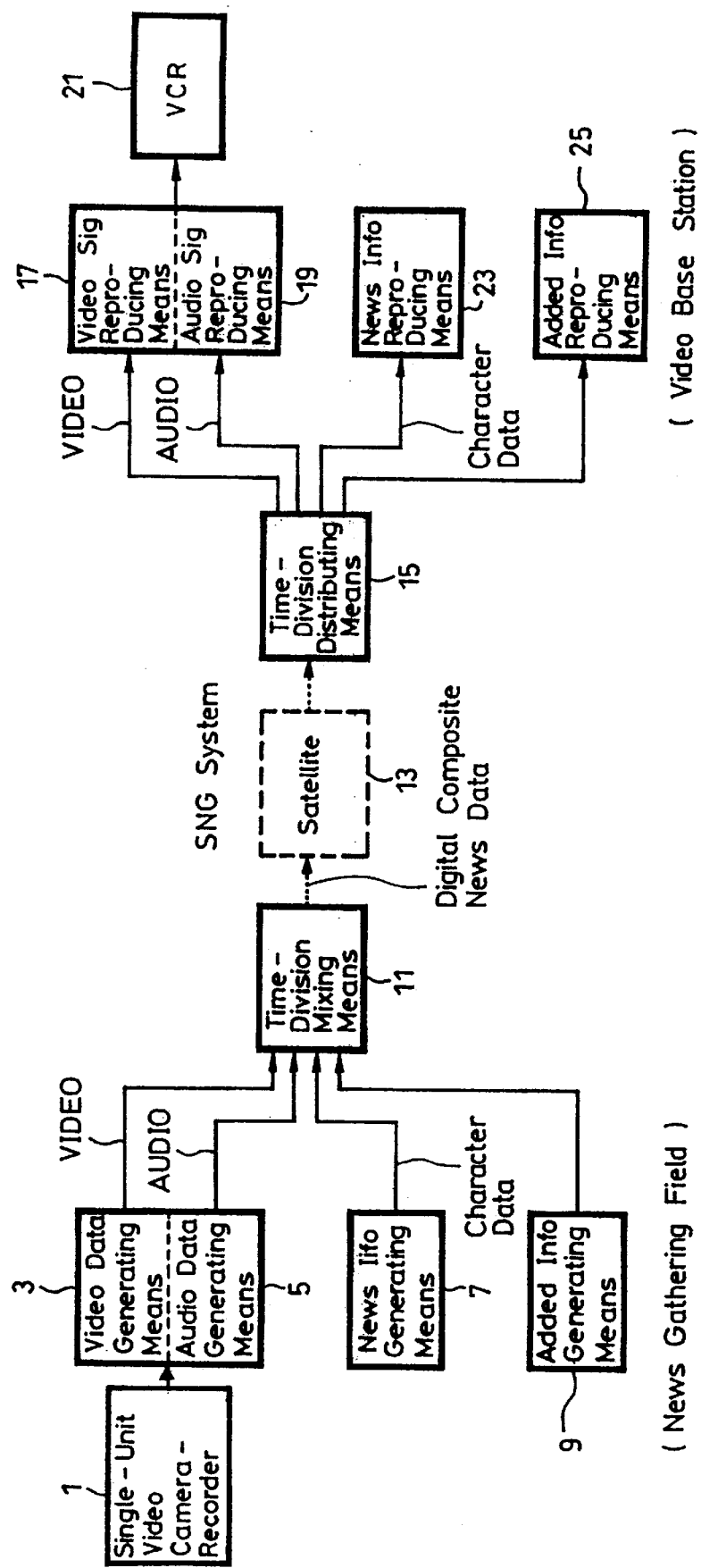
FIG. 3 is a block diagram used to explain an embodiment of the present invention from a standpoint of higher-rank concept.

FIG. 3 is a block diagram conceptually showing method of and apparatus for transmitting news data with script according to the embodiment of the present invention. A principle of the present invention is based on the fact that digital amount (data) has a feature that a timebase thereof is easy to be processed as compared with an analog amount (signal) which is continuous from a time standpoint.

As shown in FIG. 3, a video signal of composite video signal (video and audio signals) that has been picked up with a single-unit video camera-recorder 1 by a cameraman on the news gathering field is converted by a video data generating means 3 in the form of digital data, and compressed and encoded as video data VIDEO. An audio signal is converted by an audio data generating means 5 into digital audio data AUDIO. Then, gathered news data (script) written by the journalist on the news gathering field is generated by a news data information generating means 7 as digital character (script) data in the form of characters with kanji mixed thereto. Other added data are converted by an added information generating means 9 as digital added information data.

A variety of digital data relating to these specific news data are inputted to a time-division-mixing means 11, in which they are time-division-mixed. In this manner, the composite video signal is generated as composite news data with almost all relating necessary data included therein.

The composite news data is transmitted through a satellite 13 to a key station, i.e., video base station through the SNG system.

In the video base station, the composite news data thus transmitted is inputted to a time-division-distributing means 15, in which it is time-division-distributed with the same time standard as that of the time-division-mixing. The digital video data VIDEO thus time-division-distributed is timebase-expanded, decoded, and then converted into an analog video signal by a video signal reproducing means 17. Then, the digital audio data AUDIO thus time-division-distributed is converted by an audio signal reproducing means 19 into an analog audio signal. The analog video signal and the analog audio signal are both recorded by a VCR 21. Character data of the time-division-distributed gathered news data are inputted to a news data information reproducing means 23, in which they are converted into broadcasting original script data. Other added information data are reproduced by an added information data reproducing means 25, and utilized.

Figure 4:
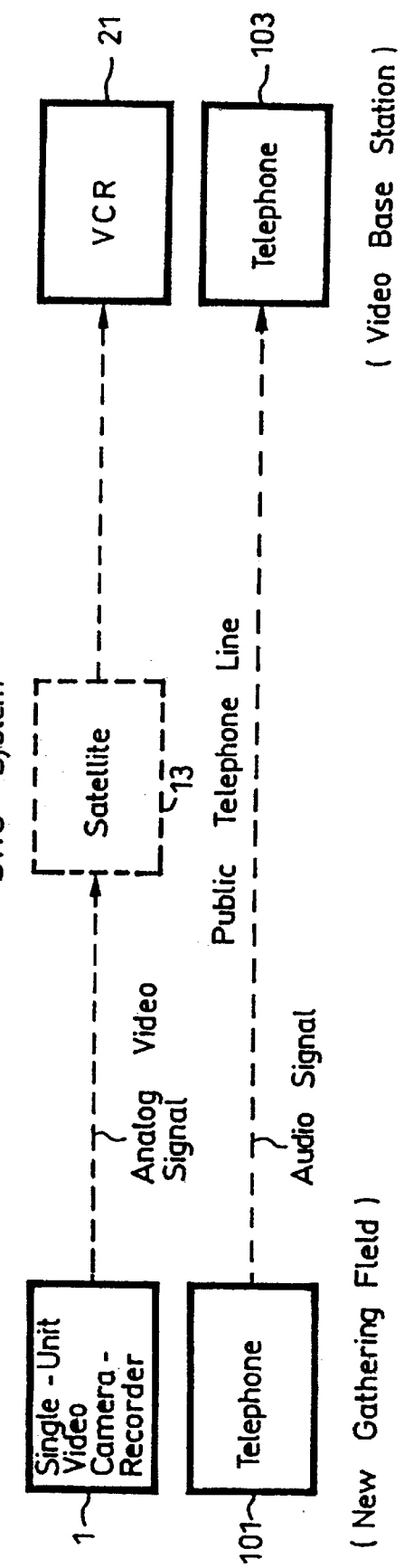
FIG. 4 is a block diagram showing a comparative example of the present invention.

FIG. 4 is a block diagram showing a transmission method as a comparative example of the embodiment shown in FIG. 3, and in which an analog video signal, which results from picking up an object of news material with the single-unit video camera-recorder 1 by the cameraman, is transmitted through the satellite 13 to the video base station by use of the SNG system as an analog video signal in which an audio signal is superimposed upon the composite video signal. In the video base station, the received analog video signal is recorded by the VCR 21. Gathered news data (script) written by the journalist on the news gathering field is transmitted by a telephone 101 through a public telephone line to a video base station telephone 103 in the form of an audio signal. In the flood of a large number of news data supplied every day, a person responsible for news tries to match the video signal transmitted thereto through the SNG line with audio script information separately transmitted thereto through the public telephone line. Thereafter, the person responsible for news writes script information on a broadcasting script. Other added information data cannot be transmitted unless they are transmitted by means of telephone.

According to this embodiment, the analog video signal with a large amount of information data is digitally converted, and the digital video signal is timebase-compressed. There is generated the composite news data in which audio data and digital data of other added information data are combined in a time-division manner while they are not superimposed upon video data in the empty region. In this manner, a variety of data relating to specific news are simultaneously transmitted as the composite news data. In that case, the existing analog SNG system utilizes the fact that digital data can be transmitted as described above.

If the method of simultaneously transmitting a plurality of relating news data as the composite news data is adopted, then the added information data including script information can be simultaneously transmitted together with video image constantly, and the person responsible for news need not match the video image with other added information data. Furthermore, the gathered news information can be simultaneously transmitted as character data with kanji mixed thereto.

Figure 5:
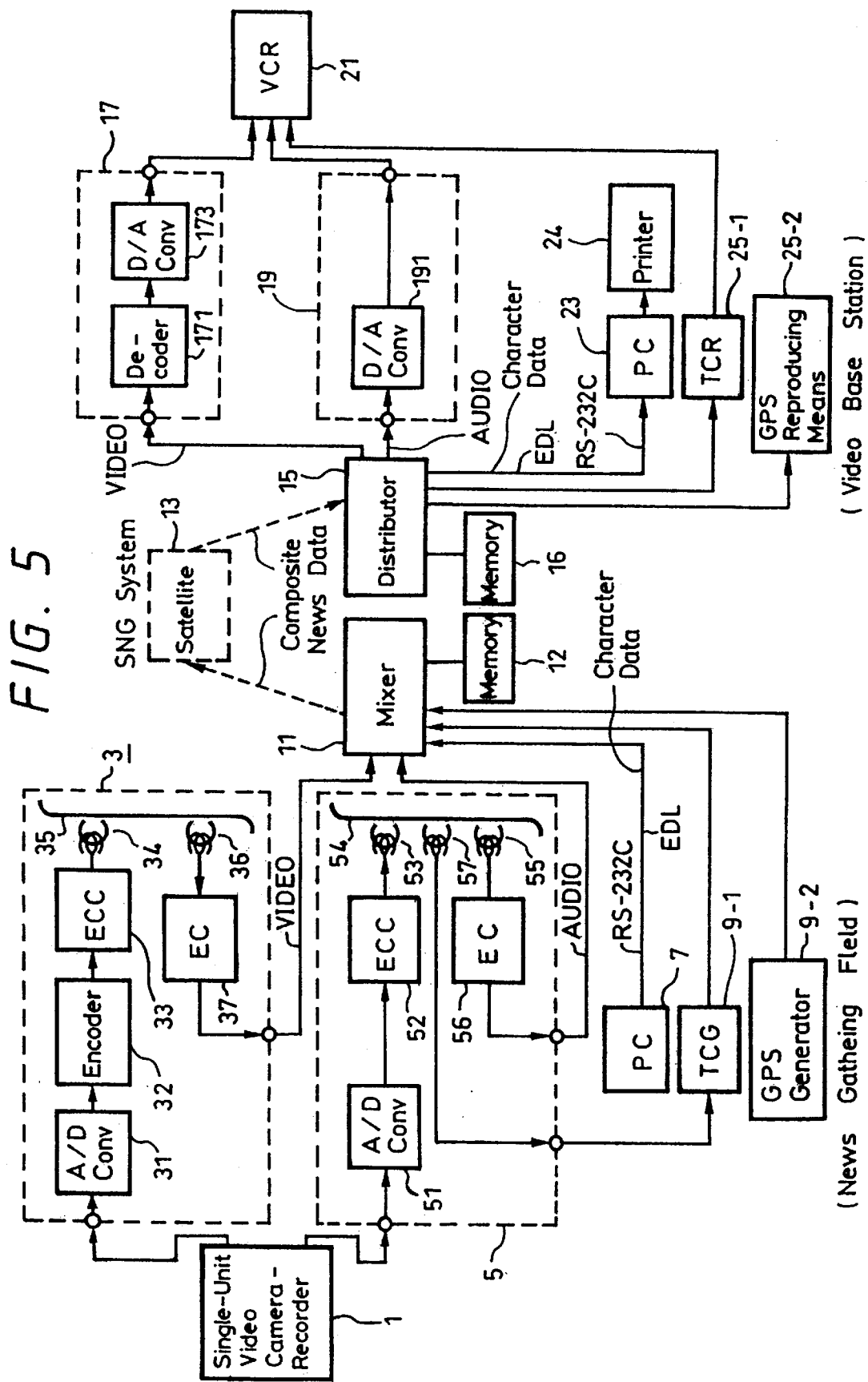
FIG. 5 is a block diagram showing method of and apparatus for transmitting news data with script according to the embodiment of the present invention.

FIG. 5 is a block diagram showing a system of a method of transmitting news data with script used in the embodiment of the present invention. In FIG. 5, the same elements and parts as those of the block diagram of FIG. 3 are marked with identical reference numerals.

In the transmitting-side equipment of the news gathering field, a picture of field and sounds of background are recorded by a portable type single-unit video camera-recorder (field camera) 1, for example.

As shown in FIG. 5, the analog composite video signal outputted from the field camera 1 is inputted to the video data generating means 3. This video data generating means 3 includes an analog-to-digital (A/D) converter 31 for converting an analog composite video signal inputted thereto from the field camera 1 into a digital composite video signal, an encoder 32 for compressing and encoding the digital composite signal outputted from the A/D converter 31, and an error-correction encoder (ECC) 3 for adding an error code to the digital composite signal supplied thereto from the encoder 32. Compressed digital video data VIDEO is temporarily recorded on a video tape 35 by a head 34. A recording format may be either so-called D1-format or D2-format. However, the above recording format is not limited to these D1-format and D2-format, and any recording format of digital VCR may be applied to the recording format of the present invention.

When the digital composite signal is encoded by the encoder 32, the digital composite signal is encoded by use of some suitable means such as an MPEG (moving picture coding experts group).

The digital compressed video data VIDEO reproduced from the video tape 35 is error-corrected by an error corrector (EC) 37, and the digital video data VIDEO thus error-corrected is outputted to a mixer 11.

Background sounds collected by the field camera 1 such as explosion sounds generated in an accident, for example, and voices of particular person interviewed are outputted from the field camera 1 to the audio data generating means 5 as an analog audio signal. The audio data generating means 5 includes an analog-to-digital (A/D) converter 51 for converting an analog audio signal to a digital audio signal, and an ECC circuit 52 for adding an error-correction code exclusively-prepared for audio signal to the digital audio signal supplied thereto from the A/D converter 51. The digital audio signal AUDIO is recorded on a video tape 54 by a head 53. As compared with the video signal, the audio signal has a considerably small amount of information, and is not data-compressed in principle.

The digital audio data AUDIO reproduced from the video tape 54 by the head 53 is error-corrected by the EC circuit 56, and the audio data AUDIO thus error-corrected is outputted to the mixer 11.

As news information generating means 7 for generating news information written by the journalist on the field, there is used a personal computer (referred to a "PC" for the sake of simplicity) 7. Script data is gathered news information. The script data is inputted by a keyboard (not shown) of the PC 7 which includes therein a word-processing software and then outputted from an output terminal conforming to the RS-232C which is a standard serial-interface used among the PC 7 and connected equipments as a digital signal. The RS-232C is determined by EIA (Electronic Industries Association), standardized in JAPAN according to the JIS C631, and is available as a PC standard interface.

Generating means for generating time code (TC), GPS information, edit decision list (EDL) information are known as added information generating means for generating other added information data relating to a specific news.

The time code (TC) is encoded and generated by a time code generator (referred to as "TCG" for the sake of simplicity) 9-1, and digital time code data is outputted to the mixer 11 from the TCG 9-1. The TCG 9-1 generates a time code serial signal by use of a signal picked up from a time code track of the video tape 54. The time code is 80-bit time information, for example. The time code may be an LTC (longitudinal time code) recorded on a longitudinal direction of an SMPTE (Society of Motion Picture and Television Engineers) video tape, and 24-hour time information composed of hours, minutes, seconds, and frames.

GPS (global positioning system) data is position information of a news transmitting source, and digital latitude and longitude data are outputted from a GPS data generating means 9-2 to the mixer 11. A GPS is a position information system which is able to accurately detect user's own position in global scale by use of radio waves transmitted from an artificial satellite. The Department of Defense has opened a SPS (standard positioning service) to the private sector as of December 1993. At present, the GPS can measure the position during 24 hours, and is utilized in a car navigation system. In this embodiment, the GPS data is used as news transmitting source position information, and includes latitude and longitude digital information data such as the north latitude and the east longitude.

The EDL (edit decision list) comprises event No., reel No., edit mode, edit transition type, edit transition time, wipe NO., EDIT-IN time, EDIT-OUT time or the like, The digital video, audio, gathered news, time code, and GPS data are time-division-mixed by the time-division mixer 11. The time-division mixer 11 time-division-mixes these data to provide composite news data. If the time-division mixer 11 includes a memory means 12, then composite news data can be temporarily stored in the memory means 12 when necessary.

A signal, which is transmitted in the SNG system or the ENG system, is a signal composed of an analog video composite signal with an audio signal superimposed thereon. On the other hand, the signal transmitted according to this embodiment is data in the form of digital data, and is composite news data in which not only video data and audio data but also added information data relating to the news such as script data or GPS data are time-division-mixed.

Figure 6:
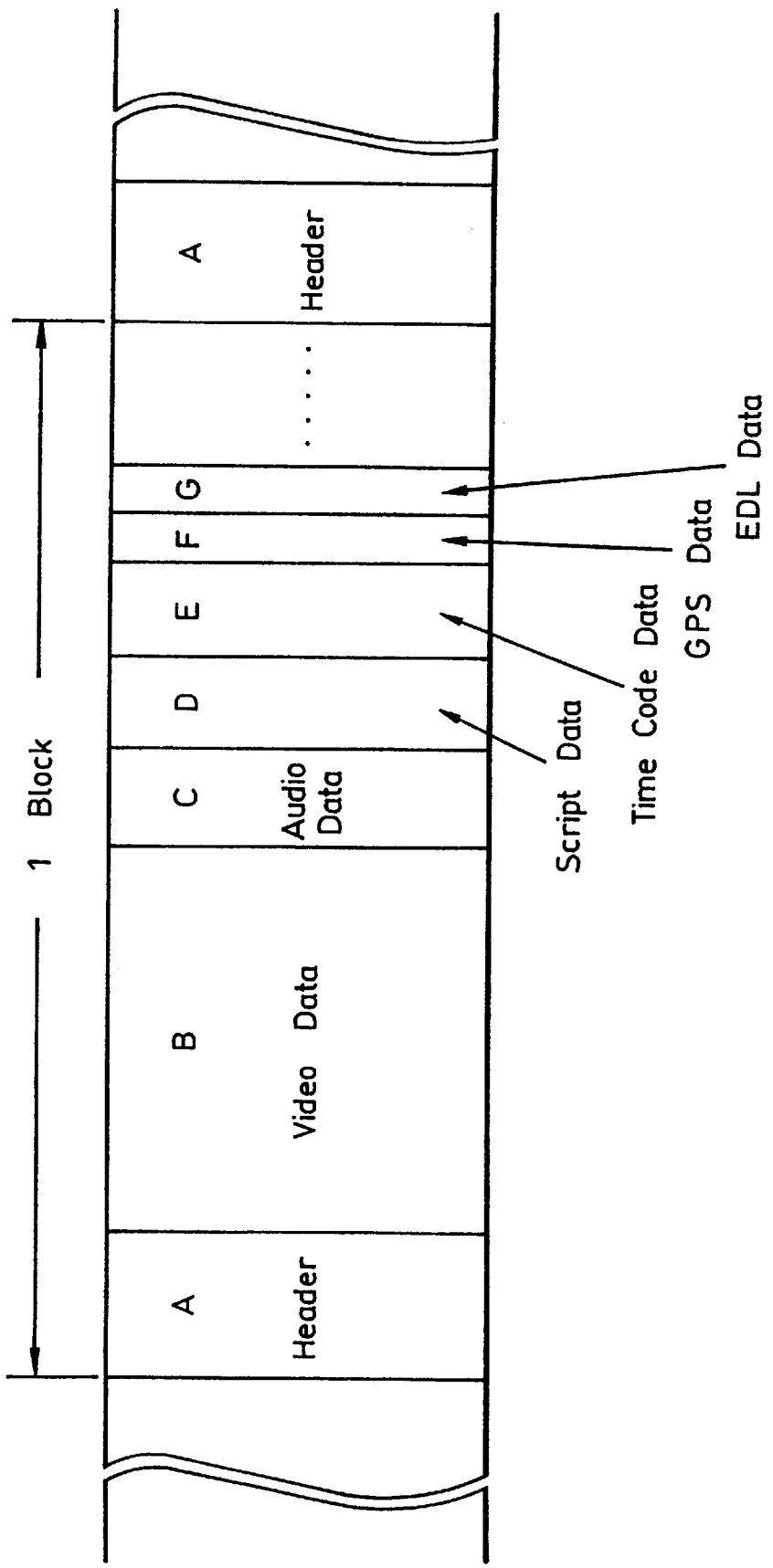
FIG. 6 is a diagram showing a data format of composite news data transmitted by utilizing a news gathering system in the embodiment shown in FIG. 5.

A data format of time-division-mixed composite digital news data will be described below. As shown in FIG. 6, a header is provided at every block, and one block is composed of about 23 Mbps (megabit per second), for example.

A header A is provided at the beginning of each block, and comprises digital data of about 10 bits. The header A includes information, such as address code data for specifying addresses of digital video data, digital audio data, digital script data, digital time code (TC) data, digital GPS data, and digital EDL data. Recording and reproducing can be carried out based on the above-mentioned address code data.

Video data B is composed of digital data of 17 Mbps, for example. In the NTSC system, a recording bit rate of digital video data is 227 Mbps according to the D1 format, for example, and 127 Mbps according to the D2 format. If data is compressed by the MPEG system or the like, a recording bit rate of digital video data is about 17 Mbps, which is compressed to about 1/7 to 1/12 of that of the data that is before being compressed.

Audio data C is about 3 Mbps, and need not be compressed in principle.

As added information such as gathered news information or the like, there are enumerated digital script data D, digital time code data E, digital GPS data F, digital EDL data, etc. These added information are about 0.5 to 1 Mbps in total. Accordingly, it is sufficient that one block is about 23 Mbps.

Figure 1:
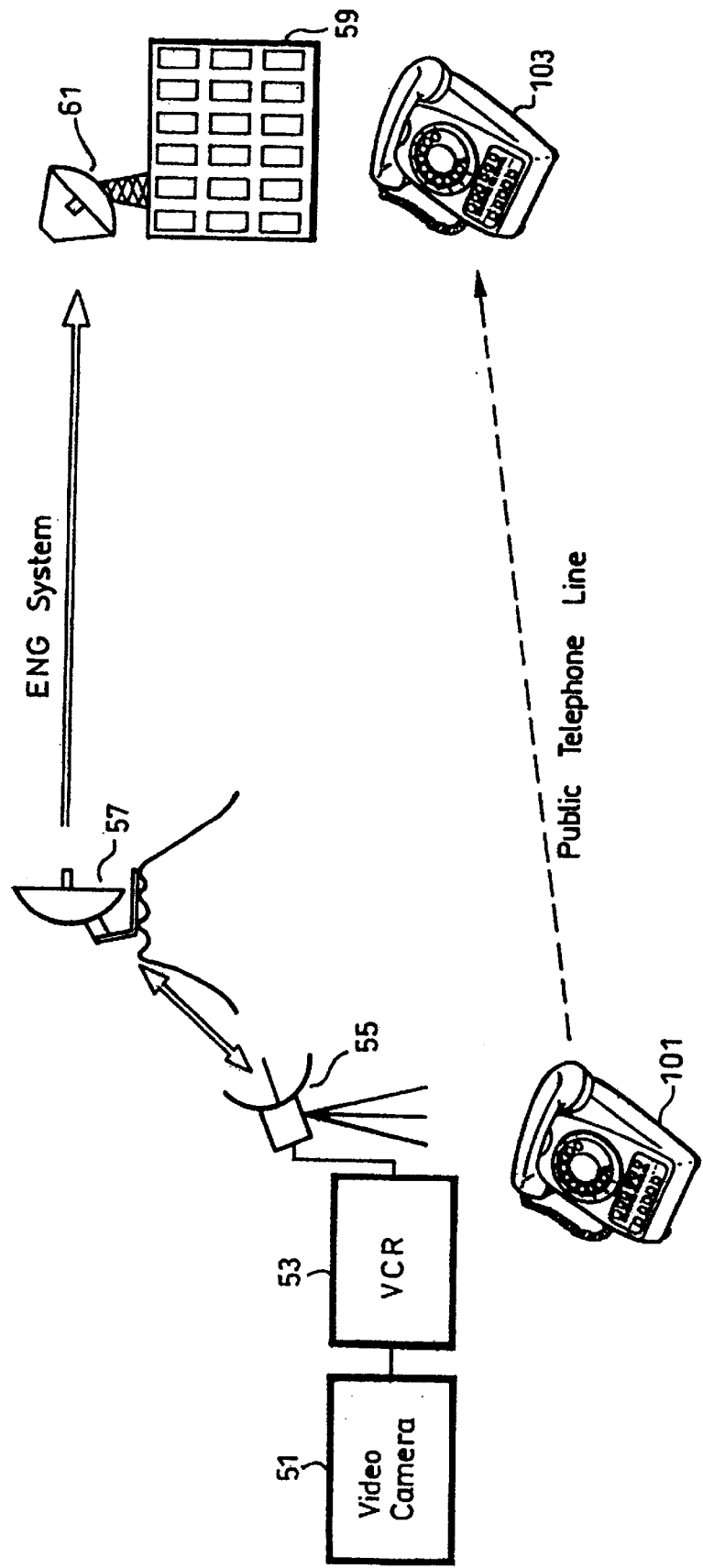
FIG. 1 is a pictorial representation used to explain an ENG (electronic news gathering) system which is one of the news transmission systems.
Figure 2:
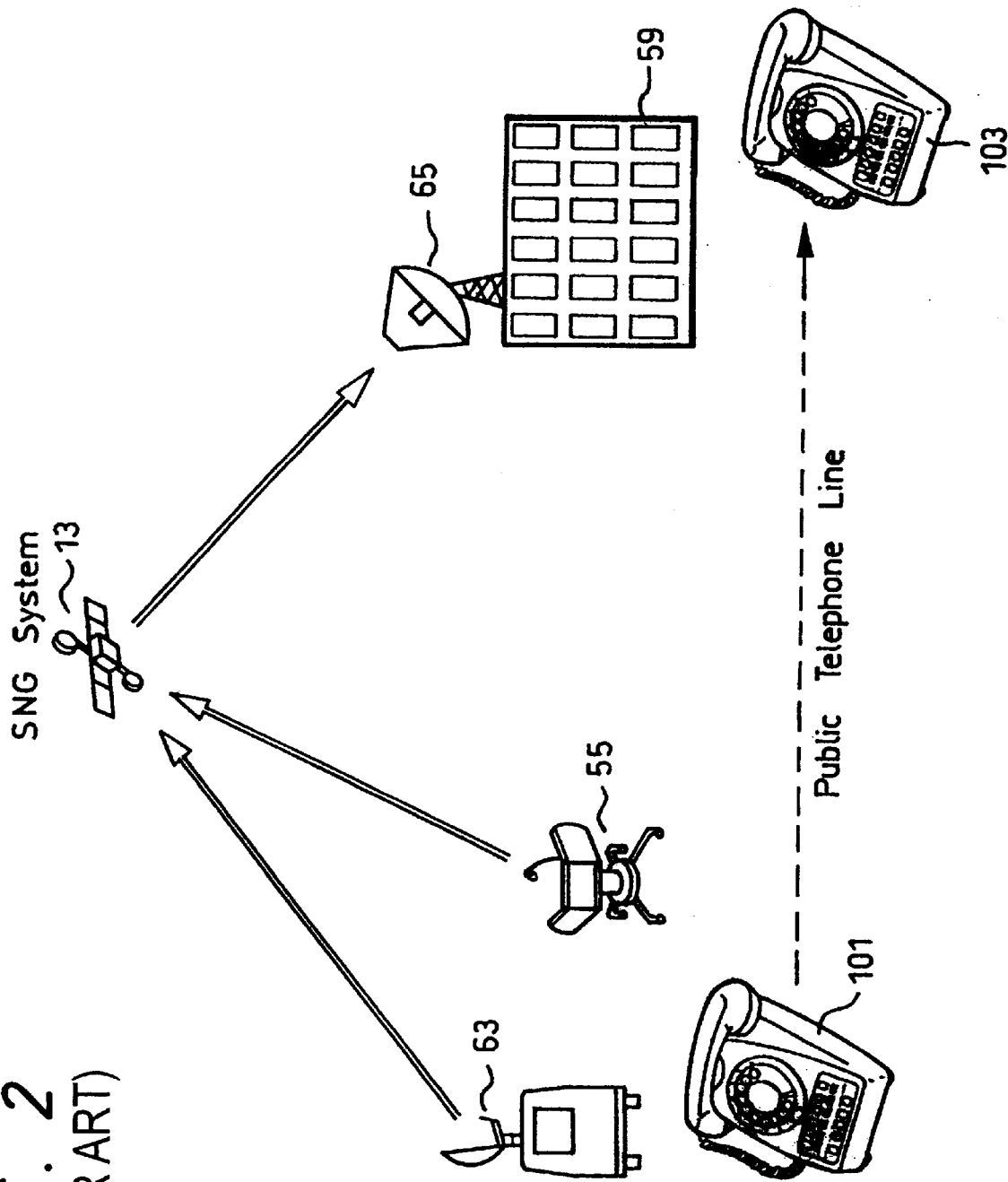
FIG. 2 is a pictorial representation used to explain an SNG (satellite news gathering) system which is one of the news transmission systems.

The SNG system is the circuit equipment for transmitting digital data which is the composite news data, and the composite news data is transmitted through the satellite 13 to the video base station 59 (see FIG. 2). Although the existing SNG circuit is prepared as an analog signal circuit for transmitting data at a transmission bit rate of about 27 Mbps per channel, a digital signal can be transmitted via this circuit in actual practice. Furthermore, if the specification is varied in future, then the ENG system can be utilized.

Referring back to FIG. 5, a reception-side equipment installed on the video base station will be described.

As shown in FIG. 5, the transmitted composite news data is time-division-distributed by a time-division-distributor 15 on the basis of the same time standard as that of the time-division-mixing used upon transmission. If the time-division-distributor 15 is provided with a memory means 16, received composite news data can be temporarily stored in the memory means 16 when necessary.

The time-division-distributed compressed digital video data VIDEO is supplied to a video signal reproducing means 17. The video signal reproducing means 17 includes a decoder 171 and a digital-to-analog (D/A) converter 173. The decoder 171 timebase-expands and decodes the digital video data VIDEO, and then the D/A converter 173 converts the digital video composite signal into an analog video composite signal.

The time-division-distributed digital audio data AUDIO is supplied to an audio signal reproducing means 19. The audio signal reproducing means 19 includes a digital-to-analog (D/A) converter 191, and the D/A converter 191 converts the audio data AUDIO into an analog audio signal.

The time-division-distributed digital time code data is converted into and decoded to analog time code data by a time code reader (TCR) 25-1 which is one of an added information reproducing means 25, and thereby obtained as an analog time code signal.

Analog video composite signal, audio signal and time code signal are inputted to a VCR 21, and thereby a video image is recorded.

The time-division-distributed digital script data is directly inputted to a PC 23 which is one of the added information reproducing means 25 through the RS-232C interface. The PC 23 outputs the script data from a printer 24 as broadcasting script, if necessary. The script data thus transmitted is character data with kanji mixed thereto that was inputted to the PC 7 by the journalist with the keyboard on the news gathering field. Data such as place name can be accurately transmitted to the news center.

The time-division-distributed digital EDL data is reproduced by the PC 23 similarly to the script information, printed out by a printer 24, and used.

The time-division-distributed digital GPS data is reproduced by a GPS reproducing means 25-2, i.e., one of the added information reproducing means 25 as position information indicative of the north latitude and the east longitude, and used.

The most specific feature of the present invention lies in that the analog video signal is converted to the digital video signal and timebase-compressed, and audio data and other added information digital data are combined with the resultant empty region in a time-division manner while the audio data and other added information digital data are not superimposed upon the video data, thereby generating and transmitting the composite news data.

According to the method of transmitting a plurality of relating news data as the composite news data, added information with news information mixed thereto can constantly be transmitted together with the video image data simultaneously, and the gathered news information can be transmitted as the character data with kanji mixed thereto.

A manner in which a plurality of relating news data included in the composite news data (see FIG. 6) are displayed in a composite manner on divided picture screens of one picture of a display device will be described with reference to FIG. 7. A display screen of a display device 27 is divided as follows.

Figure 7:
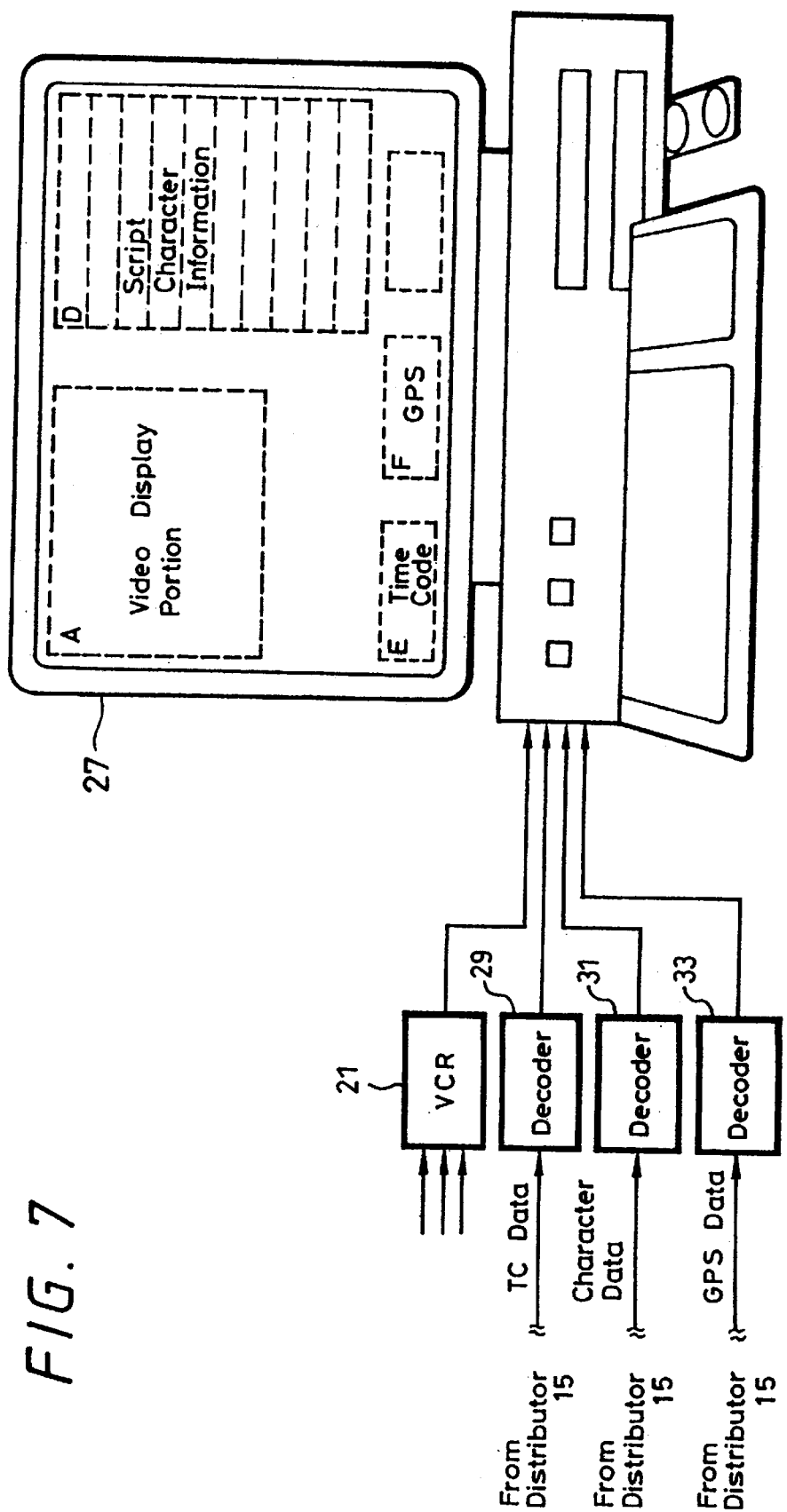
FIG. 7 is a schematic diagram, partly in block form, used to explain a manner in which a plurality of relating news data included in composite news data are displayed on sub-picture screens in a picture screen of a display apparatus collectively.

As shown in FIG. 7, a video image display portion A is located on upper left of ¼ of the picture screen. The video image signal from the VCR 21 (see FIG. 5) is reduced to ¼ of the whole picture screen in size, and displayed by use of QCIF (quarter common intermediate format).

A script character information display portion D is located adjacent to the video image display portion A on the right half portion of the picture screen of the display device 27. This script character information signal is obtained from the distributor 15 (see FIG. 5) through the decoder 31. A time code display portion E is located beneath the video display portion A. This time code signal is obtained from the distributor 15 (see FIG. 5) through the decoder 29. A GPS information display portion F is located on the lower side of the picture screen of the display device 27. This GPS information signal is obtained from the distributor 15 (see FIG. 5) through the decoder 33. Sounds can be emanated from a speaker (not shown).

Since data relating to news are displayed on one picture screen, the viewer of display device can obtain a variety of information data concerning the news.

According to the present invention, it is possible to provide method of and apparatus for transmitting news data with script wherein video information and added information such as gathered news information are made corresponding to each other and the video information and the added information can be simultaneously transmitted from the news gathering field to the news center.

Furthermore, according to the present invention, upon transmission, gathered news information that is transmitted together with the video information can be transmitted in the form of not sounds but in the form of characters with kanji mixed thereto.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video data transmitting apparatus for transmitting a source digital video signal prior to having editing performed thereon from a transmitting side to a receiving side, comprising:

video signal encoding means for encoding said source digital video signal to generate an encoded video signal at said transmitting side;

edit point data generating means for generating edit points data at said transmitting side comprising a plurality of edit points which are associated with said source digital video signal and which are used to define actual edits that are to be performed on said digital video at said receiving side, but which are maintained apart from source digital video data, and therefore do not edit the source digital video data at said transmitting side;

multiplexing means for multiplexing said encoded video signal and said edit points data to generate multiplexed data; and data transmitting means for transmitting said multiplexed data from said transmitting side to said receiving side so that an editing operation is performed on said video data at said receiving side based upon said edit points data to generate edited video data.

2. The video data transmitting apparatus of claim 1, wherein said multiplexing means multiplexes time code data of said source digital video signal.

3. The video data transmitting apparatus of claim 1, wherein said edit points data further comprises at least one of event number, reel number, edit mode, edit transition type, edit transition time, wipe number, edit-in time and edit-out time.

4. The video data transmitting apparatus of claim 1, wherein said edit points data is contained within a header at a leading portion of each of a plurality of data blocks.

5. A method for transmitting a source digital video signal prior to having editing performed thereon from a transmitting side to a receiving side, comprising the steps of:

generating edit points data at said transmitting side comprising a plurality of edit points which are associated with said source digital video signal and which are used to define actual edits that are to be performed on said digital video at said receiving side, but which are maintained apart from source digital video data, and therefore do not edit the source digital video data at said transmitting side;

encoding said source digital video signal to generate an encoded video signal;

multiplexing said encoded video signal and said edit points data to generate multiplexed data; and transmitting said multiplexed data from said transmitting side to said receiving side so that an editing operation will be performed on said video data at said receiving side based upon said edit points data to generate edited video data.

6. The method of claim 5, further comprising the step of multiplexing time code data of said source digital video signal.

7. The method of claim 5, wherein said edit points data comprises at least one of event number, reel number, edit mode, edit transition type, edit transition time, wipe number, edit-in time and edit-out time.

8. The method of claim 5, further comprising the step of positioning said edit points data within a header at a leading portion of each of a plurality of data blocks.

* * * * *